United States Patent
Carroll et al.

(10) Patent No.: US 11,990,863 B2
(45) Date of Patent: May 21, 2024

(54) RAIL FOR A PHOTOVOLTAIC MODULE ARRANGEMENT

(71) Applicant: Brantingham and Carroll Holdings, Inc., Leetsdale, PA (US)

(72) Inventors: James A. Carroll, Aiken, SC (US); Thomas Carroll, Aiken, SC (US); Marvin Hochstedler, Melipilla (CL); José Miguel Tomicic Müller, Santiago (CL)

(73) Assignee: Brantingham and Carroll Holdings, Inc., Leetsdale, PA (US)

( * ) Notice: Subject to any disclaimer, the term of this patent is extended or adjusted under 35 U.S.C. 154(b) by 0 days.

(21) Appl. No.: 17/665,775

(22) Filed: Feb. 7, 2022

(65) Prior Publication Data
US 2022/0255496 A1  Aug. 11, 2022

Related U.S. Application Data (60) Provisional application No. 63/146,959, filed on Feb. 8, 2021.

(51) Int. Cl.
*H02S 30/10*   (2014.01)
*F16B 5/12*    (2006.01)

(52) U.S. Cl.
CPC .............. *H02S 30/10* (2014.12); *F16B 5/12* (2013.01)

(58) Field of Classification Search
CPC ....................................................... H02S 30/10
See application file for complete search history.

(56) References Cited

U.S. PATENT DOCUMENTS

| | | | |
|---|---|---|---|
| 8,191,321 B2 | 6/2012 | McClellan et al. | |
| 8,726,587 B2 | 5/2014 | Nuernberger et al. | |
| 9,194,613 B2 | 11/2015 | Nuernberger et al. | |
| 10,536,108 B2 | 1/2020 | Goldberg et al. | |
| 10,696,451 B2 | 6/2020 | Britcher et al. | |
| 2011/0290297 A1* | 12/2011 | Springer | F24S 25/632 136/244 |
| 2014/0246549 A1* | 9/2014 | West | H02S 20/30 248/220.22 |
| 2020/0153382 A1* | 5/2020 | Ballentine | F24S 25/636 |
| 2020/0244212 A1* | 7/2020 | Gabor | H02S 30/10 |
| 2020/0373877 A1 | 11/2020 | Watson | |
| 2021/0075366 A1* | 3/2021 | West | F16M 13/02 |
| 2022/0209712 A1* | 6/2022 | Reynolds | H02S 30/00 |

OTHER PUBLICATIONS

Alibaba.com, "Solar Roof Mounting Aluminum Rail" https://www.alibaba.com/product-detail/Solar-Roof-Mounting-Aluminum-Rail_62309806026.html?mark=google_shopping&seo=1, retrieved on Aug. 9, 2022, 1 page.

* cited by examiner

*Primary Examiner* — Jayne L Mershon
(74) *Attorney, Agent, or Firm* — The Webb Law Firm (57) ABSTRACT

A rail for a photovoltaic module arrangement, the rail including a body having at least a top portion, a middle portion, and a bottom portion, the top portion including at least one upper edge in which at least one end of the upper edge defines an angle configured to receive a photovoltaic module on the body, the middle portion including at least one side edge, and the bottom portion including at least a bottom edge.

17 Claims, 6 Drawing Sheets

RAIL FOR A PHOTOVOLTAIC MODULE ARRANGEMENT

CROSS REFERENCE TO RELATED APPLICATION

This application claims benefit of priority from U.S. Provisional Patent Application No. 63/146,959, filed Feb. 8, 2021, the contents of which is incorporated herein by reference in its entirety.

BACKGROUND OF THE INVENTION

Field of the Invention

The present disclosure is directed to a photovoltaic module arrangement and, more particularly, to a rail for a photovoltaic module arrangement.

Description of Related Art

The utility and commercial solar space is a highly competitive marketplace, where margins are razor thin. Cost of ownership is the key factor driving the selection of components for solar power plants driving owners, electronic power control and equipment manufacturers to evaluate every step of the design, development, and construction of solar power plants to minimize cost in every possible way.

Currently, installers spend considerable time and effort to move a photovoltaic module around on an arrangement to line up mounting holes on the photovoltaic module panel frame and holes on the photovoltaic module mounting rails. The current method used by installers takes considerable time and effort and increases the installation cost unnecessarily. Therefore, there is a current need in the industry for a rail for a photovoltaic module arrangement that eases and improves the installation method and time for a photovoltaic module on the photovoltaic module arrangement.

SUMMARY OF THE INVENTION

In one embodiment, a rail for a photovoltaic module arrangement is provided. The rail may include a body having at least a top portion, a middle portion, and a bottom portion, the top portion may include at least one upper edge, the at least one end of the upper edge defining an angle configured to receive a photovoltaic module on the body, the middle portion may include at least one side edge, and the bottom portion may include at least a bottom edge.

In another embodiment, a method of installing a rail for a photovoltaic module arrangement is provided. The method may include the steps of providing at least one rail. The at least one rail may include a body having at least a top portion, a middle portion, and a bottom portion, the top portion may include at least one upper edge, the at least one end of the upper edge defining an angle configured to receive a photovoltaic module on the body, the middle portion may include at least one side edge, and the bottom portion may include at least a bottom edge. The method may further include connecting the at least one rail to one or more beams of a photovoltaic module arrangement, such that connecting the at least one rail to one or more beams may include aligning the one or more holes of the bottom portion of the rail to one or more holes of the photovoltaic module arrangement.

Various aspects of the present disclosure may be further characterized by one or more of the following clauses:

Clause 1: A rail for a photovoltaic module arrangement, the rail comprising a body having at least a top portion, a middle portion, and a bottom portion, the top portion comprising at least one upper edge, wherein at least one end of the upper edge defines an angle configured to receive a photovoltaic module on the body, the middle portion comprising at least one side edge, and the bottom portion comprising at least a bottom edge.

Clause 2: The rail of clause 1, wherein the upper edge of the top portion comprises at least one notch configured to receive the photovoltaic module.

Clause 3: The rail of clause 1 or 2, wherein the upper edge of the top portion comprises two or more notches configured to receive the photovoltaic module.

Clause 4: The rail of any of clauses 1 to 3, wherein the upper edge of the top portion comprises two notches configured to receive the photovoltaic module.

Clause 5: The rail of any of clauses 1 to 4, wherein the angle of the upper edge is in a range from about 0 degrees to about 90 degrees or from about 30 degrees to about 60 degrees.

Clause 6: The rail of any of clauses 1 to 5, wherein the angle of the upper edge is in a range from about 0 degrees to about 90 degrees.

Clause 7: The rail of any of clauses 1 to 6, wherein the angle of the upper edge is in a range from about 30 degrees to about 60 degrees.

Clause 8: The rail of any of clauses 1 to 7, wherein the angle of the upper edge is about 45 degrees.

Clause 9: The rail of any of clauses 1 to 8, wherein the at least one end of the upper edge comprises a second end, the second end optionally comprising a curved portion.

Clause 10: The rail of any of clauses 1 to 9, wherein the at least one end of the upper edge comprises a second end, the second end comprising a curved portion.

Clause 11: The rail of any of clauses 1 to 10, wherein the upper edge of the top portion comprises one or more holes for aligning the rail to the photovoltaic module arrangement.

Clause 12: The rail of any of clauses 1 to 11, wherein the upper edge of the top portion comprises two or more holes for aligning the rail to the photovoltaic module arrangement.

Clause 13: The rail of any of clauses 1 to 12, wherein the upper edge of the top portion comprises three or more holes for aligning the rail to the photovoltaic module arrangement.

Clause 14: The rail of any of clauses 1 to 13, wherein the upper edge of the top portion comprises four or more holes for aligning the rail to the photovoltaic module arrangement.

Clause 15: The rail of any of clauses 1 to 14, wherein the upper edge of the top portion comprises four or more holes for aligning the rail to the photovoltaic module arrangement.

Clause 16: The rail of any of clauses 1 to 15, wherein the upper edge of the top portion comprises five or more holes for aligning the rail to the photovoltaic module arrangement.

Clause 17: The rail of any of clauses 1 to 16, wherein the upper edge of the top portion comprises six or more holes for aligning the rail to the photovoltaic module arrangement.

Clause 18: The rail of any of clauses 1 to 17, wherein the upper edge of the top portion is aligned substantially horizontal to the middle portion.

Clause 19: The rail of any of clauses 1 to 18, wherein the side edge of the middle portion is aligned substantially perpendicular to the upper edge.

Clause 20: The rail of any of clauses 1 to 19, wherein the side edge of the middle portion comprises a distal end having a curved portion.

Clause 21: The rail of any of clauses 1 to 20, wherein the middle portion comprises at least two side edges.

Clause 22: The rail of any of clauses 1 to 21, wherein the middle portion comprises two side edges.

Clause 23: The rail of any of clauses 1 to 22, wherein the at least two side edges define a taper.

Clause 24: The rail of any of clauses 1 to 23, wherein the taper is at an angle in a range from about 0.01 degrees to about 45 degrees.

Clause 25: The rail of any of clauses 1 to 24, wherein the taper is at an angle in a range from about 0.5 degrees to about 30 degrees.

Clause 26: The rail of any of clauses 1 to 25, wherein the taper is at an angle in a range from about 1.0 degrees to about 20 degrees.

Clause 27: The rail of any of clauses 1 to 26, wherein the taper is at an angle in a range from about 1.5 degrees to about 15 degrees.

Clause 28: The rail of any of clauses 1 to 27, wherein the bottom edge of the bottom portion is aligned substantially horizontal to the middle portion.

Clause 29: The rail of any of clauses 1 to 28, wherein the bottom edge of the bottom portion is aligned horizontal to the middle portion.

Clause 30: The rail of any of clauses 1 to 29, wherein the bottom edge of the bottom portion comprises at least one end having a curved portion.

Clause 31: The rail of any of clauses 1 to 30, wherein the bottom edge of the bottom portion comprises at least two ends having a curved portion.

Clause 32: The rail of any of clauses 1 to 31, wherein the bottom portion comprises one or more holes for aligning the rail to the photovoltaic module arrangement.

Clause 33: The rail of any of clauses 1 to 32, wherein the bottom portion comprises two or more holes for aligning the rail to the photovoltaic module arrangement.

Clause 34: The rail of any of clauses 1 to 33, wherein the bottom portion comprises three or more holes for aligning the rail to the photovoltaic module arrangement.

Clause 35: The rail of any of clauses 1 to 34, wherein the bottom portion comprises four or more holes for aligning the rail to the photovoltaic module arrangement.

Clause 36: The rail of any of clauses 1 to 35, wherein the bottom portion comprises five or more holes for aligning the rail to the photovoltaic module arrangement.

Clause 37: The rail of any of clauses 1 to 36, wherein the bottom portion comprises six or more holes for aligning the rail to the photovoltaic module arrangement.

Clause 38: The rail of any of clauses 1 to 37, wherein the top portion, the middle portion, or the bottom portion comprise a material, the material selected from the group consisting of steel, aluminum, metal, or a combination thereof.

Clause 39: The rail of any of clauses 1 to 38, wherein the material is steel.

Clause 40: The rail of any of clauses 1 to 39, wherein the material is aluminum.

Clause 41: The rail of any of clauses 1 to 40, wherein the material is metal.

Clause 42: A method of installing a rail for a photovoltaic module arrangement, the method comprising the steps of providing at least one rail of any of clauses 1 to 41, and connecting the at least one rail to one or more beams of a photovoltaic module arrangement, wherein connecting the at least one rail to one or more beams comprises aligning the one or more holes of the bottom portion of the rail to one or more holes of the photovoltaic module arrangement.

BRIEF DESCRIPTION OF THE DRAWINGS

The novel features described herein are set forth with particularity in the appended claims. Such features, however, both as to organization and methods of operation, may be better understood by reference to the following description, taken in conjunction with the accompanying drawings.

DESCRIPTION OF THE DISCLOSURE

In the following detailed description, reference is made to the accompanying drawings, which form a part hereof. The illustrative features shown and described in the detailed description, drawings, and claims are not meant to be limiting. Other features may be utilized, and other changes may be made, without departing from the scope of the subject matter presented here.

Before describing the various aspects of the rail for a photovoltaic module arrangement and various features thereof in detail, it should be noted that the various aspects disclosed herein are not limited in their application or use to the details of construction and arrangement of parts illustrated in the accompanying drawings and description. Rather, the disclosed devices may be positioned or incorporated in other devices, variations, and modifications thereof, and may be practiced or carried out in various ways. Accordingly, aspects of the rail disclosed herein are illustrative in nature and are not meant to limit the scope or application thereof. Furthermore, unless otherwise indicated, the terms and expressions employed herein have been chosen for the purpose of describing the various aspects of the rail features for the convenience of the reader and are not to limit the scope thereof. In addition, it should be understood that any one or more of the components of the rail features, expressions thereof, and/or examples thereof, can be combined with any one or more of the other components, expressions thereof, and/or examples thereof, without limitation.

For purposes of the description hereinafter, spatial orientation terms, as used, shall relate to the referenced aspect as it is oriented in the accompanying drawings, figures, or otherwise described in the following detailed description. However, it is to be understood that the aspects described hereinafter may assume many alternative variations and configurations. It is also to be understood that the specific components, devices, features, and operational sequences illustrated in the accompanying drawings, figures, or otherwise described herein are simply exemplary and should not be considered as limiting.

Also, in the following description, it is to be understood that terms such as front, back, inside, outside, top, bottom, and the like are words of convenience and are not to be construed as limiting terms. Terminology used herein is not meant to be limiting insofar as devices described herein, or portions thereof, may be attached or utilized in other orientations. The various aspects of the rail features will be described in more detail with reference to the drawings.

"About" as used herein means ±10% of the referenced value. In certain embodiments, "about" means ±9%, or ±8%, or ±7%, or ±6%, or ±5%, or ±4%, or ±3%, or ±2% or ±1% of the referenced value.

The present disclosure provides a means to significantly improve the installation time of a photovoltaic arrangement by providing a streamlined and efficient method to place and align photovoltaic modules on the supporting rails (e.g., photovoltaic module rails), thus eliminating the need for the installer to spend considerable time and effort in finding a corresponding mounting hole in the photovoltaic module rail. The present disclosure further provides a design that allows for appropriate spacing (e.g., gaps) between adjacent photovoltaic modules. Thus, such a design prevents adjacent photovoltaic modules from touching one another, while also improving the aesthetic qualities desired by users or installers.

Figure 1A:
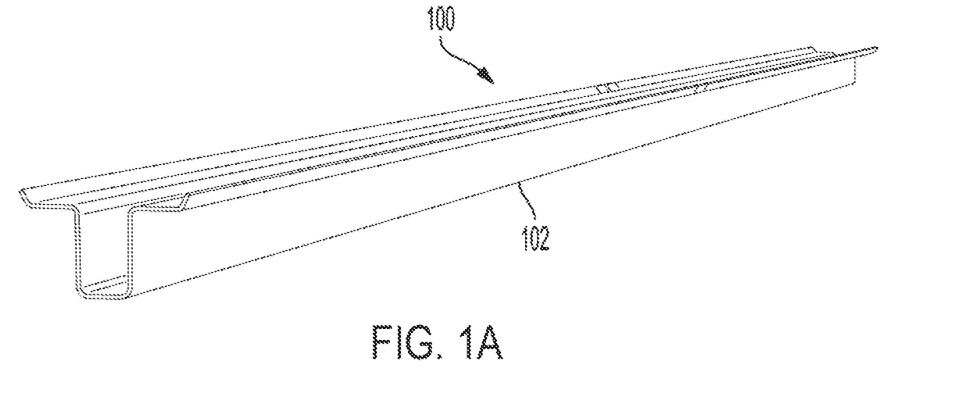
FIG. 1A is a perspective view of a rail for a photovoltaic module arrangement according to one example of the present disclosure.
Figure 1B:
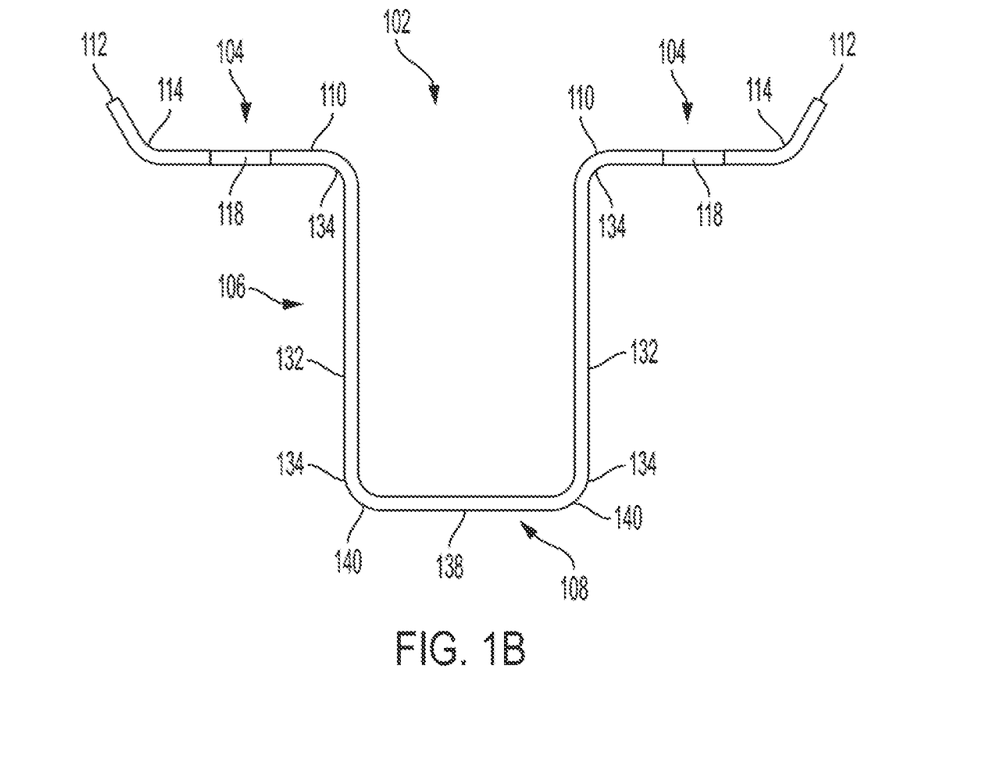
FIG. 1B is a cross-sectional view of the rail of FIG. 1A.

As illustrated in FIGS. 1A and 1B, the present rail (100) may include, in one non-limiting example of the present disclosure, a body (102) configured in an upside-down hat orientation. Although not depicted in FIGS. 1A and 1B, in some embodiments, the body (102) can be configured in a right-side up orientation. The body (102) of the rail (100) may further include at least a top portion (104), a middle portion (106), or a bottom portion (108). In some embodiments, the top portion (104) may include at least one upper edge (110) aligned substantially horizontal to the middle portion (106). In some embodiments, the top portion (104) may include the upper edge (110) having at least one end (112) that defines an angle (114) such that the end (112) receives and/or aligns a photovoltaic module (116). As depicted in FIG. 1B, the at least one end (112) can be configured in a turned-up configuration, although additional configurations are contemplated and described herein. As further illustrated in FIGS. 1A and 1B, in some embodiments, the top portion (104) may include two or more ends (112) wherein each end (112) defines an angle (114), respectively, such that each end (112) receives and/or aligns the photovoltaic module (116). During installation, the installer may place the photovoltaic module (116) on the ends (112) and slides the photovoltaic module down the rail (100) until the photovoltaic module (116) drops or is received by one or more notches described below.

In some embodiments, an angle (114) defined by the end (112) of the upper edge (110) is in a range from about 0 degrees to about 90 degrees, more preferably, from about 30 degrees to about 60 degrees. In a preferred embodiment, the angle (114) defined by the end (112) is about 45 degrees. It is also to be understood, without departing from the present disclosure, that the angle (114) defined by the end (112) of the upper edge (110) can be modified based on the design of the photovoltaic module (116) such that each end (112) receives and/or aligns the photovoltaic module (116).

Figure 1C:
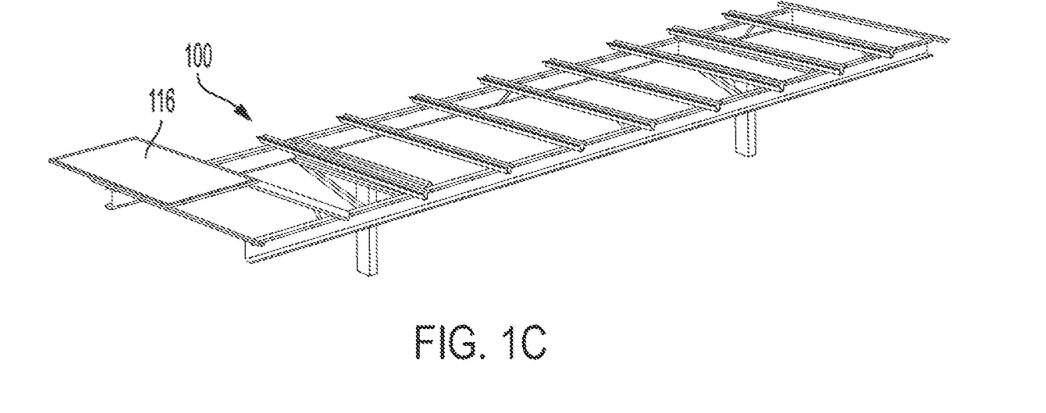
FIG. 1C is a perspective view of the rails of FIG. 1A arranged in a series onto the photovoltaic module arrangement according to one example of the present disclosure.
Figure 1D:
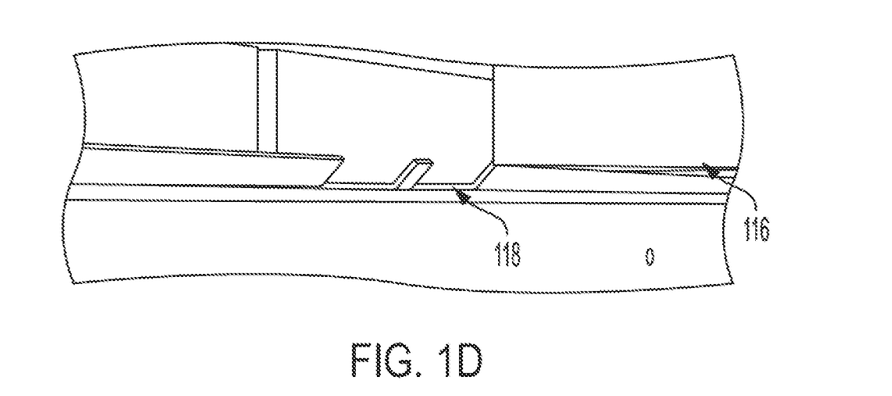
FIG. 1D is an enlarged side view of the rail of FIG. 1A according to one example of the present disclosure.

Referencing FIGS. 1A-1D, in another aspect or embodiment of the present disclosure, the upper edge (110) of the top portion (104) may also include at least one notch (118) for receiving and/or aligning the photovoltaic module (116). In some embodiments, the top portion (104) may include two notches (118), each notch (118) configured to receive and/or align the photovoltaic module (116). As illustrated in FIGS. 1C and 1D, in some embodiments, the two notches (118) can be located at or near a center of the rail (100) to act as stops for the photovoltaic module (116), thus holding the photovoltaic module (116) in place as a photovoltaic module arrangement (124) is tilted back and forth to fasten the photovoltaic module (116). In some embodiments, the two notches (118) can be located at or near a distal or a proximal end of the rail (100). It is to be understood that the two notches (118) illustrated in FIG. 1D represent only a portion of the rail of FIGS. 1A and 1B, and thus, the rail (100) may include additional notches not depicted in FIG. 1D either on the same side of the opposite side of the rail (100) at or near a center, a proximal end, or a distal end of rail (100).

Figure 2A:
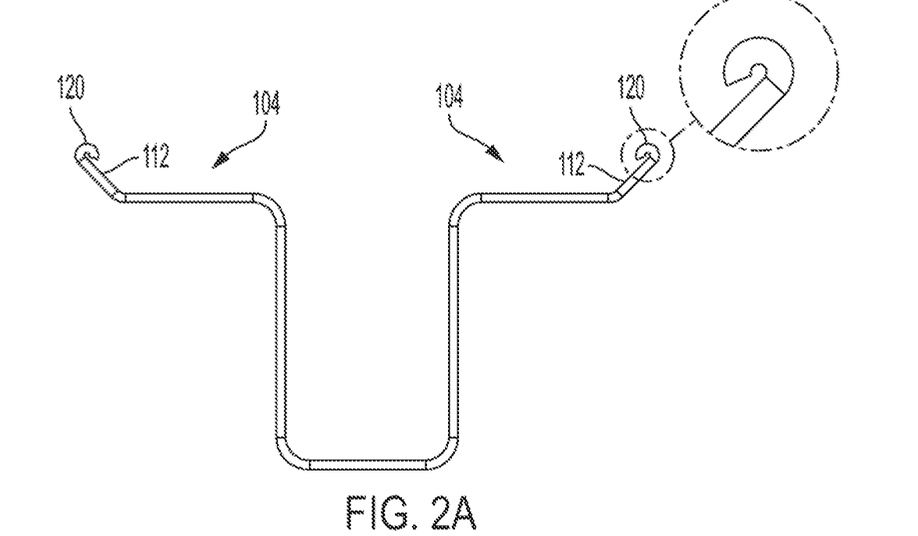
FIGS. 2A-2D are cross-sectional views of a rail for a photovoltaic module arrangement according to some examples of the present disclosure.
Figure 2B:
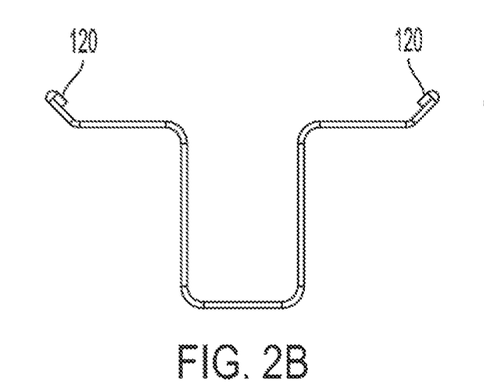
Figure 2C:
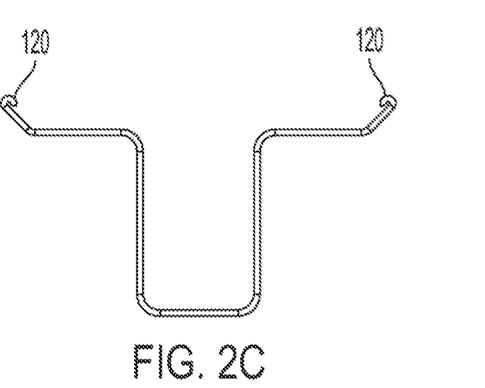
Figure 2D:
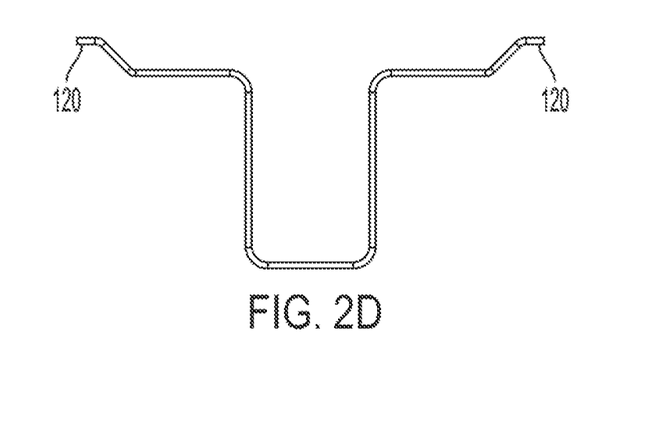

In a further aspect or embodiment of the present disclosure, FIGS. 2A-2D depict a top portion (104) that may include two or more ends (112), each of the two or more ends (112) defining a second end (120). In some embodiments, the second ends (120) are configured as a curved (FIGS. 2A-2C) or a blunt portion (FIG. 2D). As would be understood by those of skill in the art, the second ends (120) are configured so as to not damage or scratch the photovoltaic module (116) during installation of the photovoltaic module (116).

Figure 3:
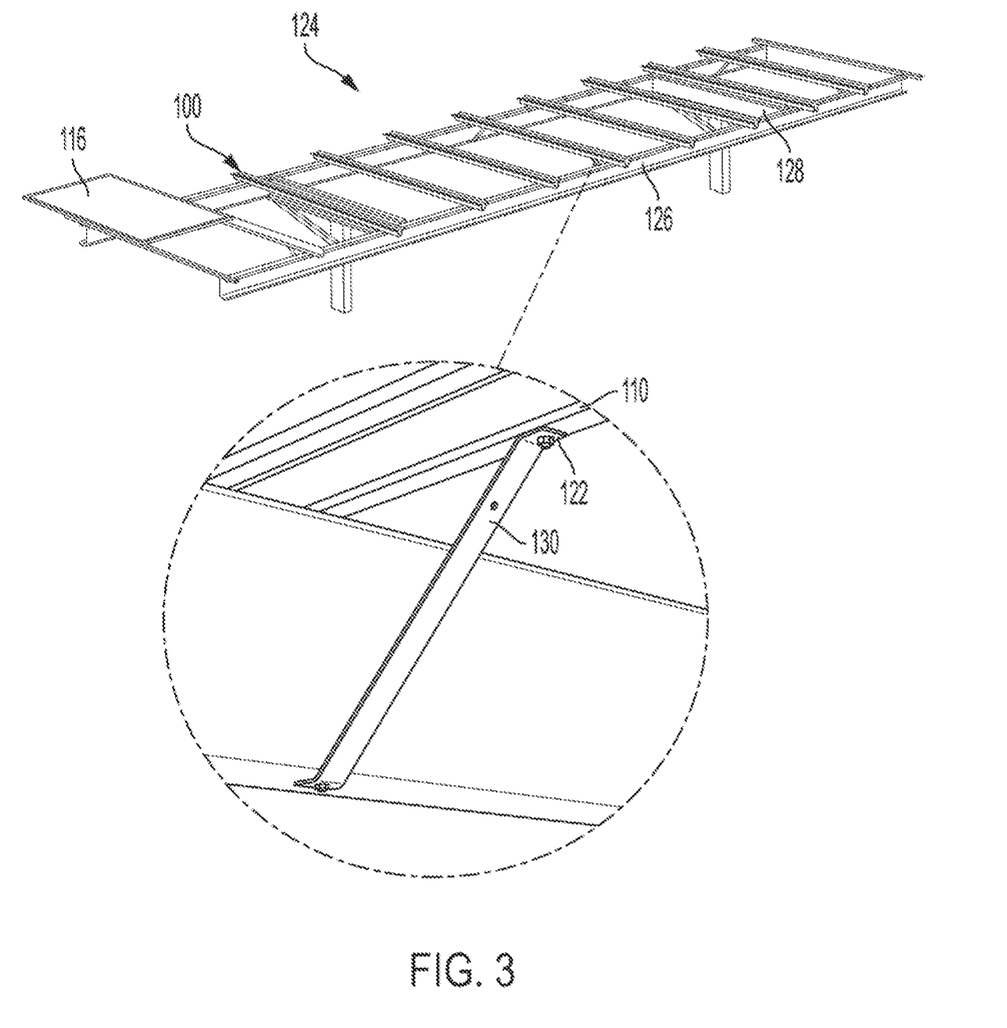
FIG. 3 is an exploded bottom view of the rail of FIG. 1C arranged in a series onto the photovoltaic module arrangement according to one example of the present disclosure.

In further embodiments of the present disclosure, the upper edge (110) of the top portion (104) may comprise one or more holes (122) for aligning the rail (100) to the photovoltaic module arrangement (124) as depicted in FIG. 3. In some embodiments, the one or more holes (122) are used to connect the rail (100) to a beam (126) or a rafter (128) of the photovoltaic module arrangement (124). In some embodiments, the one or more holes (122) can be located at a proximal end, a distal end, or a center of the top portion (104) of rail (100). As will be understood by those of skill in the art, the connection of the rail (100) to the beam (126) or the rafter (128) can be accomplished by using bolts or nuts through the one or more holes (122). In some embodiments, a brace (130) is further provided to allow for additional support of the rail (100) connection to the beam (126) or the rafter (128) as illustrated in FIG. 3. It is to be understood that the rail (100) can be aligned with or square to the beam (126) or the rafter (128) prior to or after fastening or connecting through the one or more holes (122).

Referencing back to FIGS. 1A and 1B, the middle portion (106) of the body (102) may also include, in one non-limiting example of the present disclosure, at least one side edge (132). In some embodiments, the middle portion (106) of the body (102) may include two or more side edges (132) as illustrated in FIGS. 1A and 1B. In some embodiments, the side edge (132) may be aligned substantially perpendicular to the upper edge (110). In some embodiments, the side edge (132) of the middle portion (106) may comprise a proximal end or a distal end having a curved portion (134). In some embodiments, the middle portion (106) of the body (102) may include two or more side edges (132), each of side edges (132) comprising a proximal end or a distal end having a curved portion (134).

Figure 4:
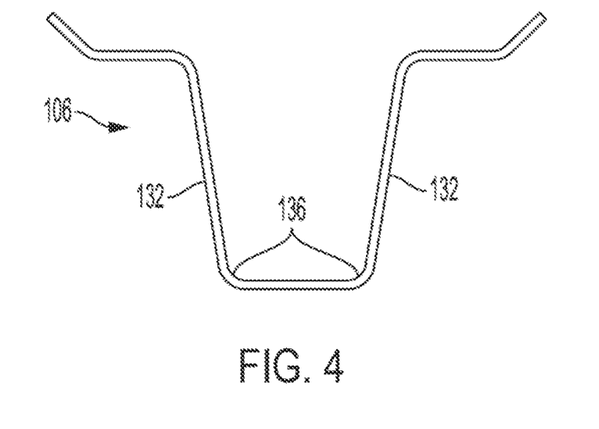
FIG. 4 is a cross-sectional view of a rail for a photovoltaic module arrangement according to one example of the present disclosure.

In some aspects or embodiments of the current disclosure, as illustrated in FIG. 4, the two or more side edges (132) of the middle portion (106) may define a taper (136) at an angle in a range from about 0.1 to about 45 degrees. In some embodiments, the taper (136) is in a range from about 0.2 to about 40 degrees, from about 0.3 to about 35 degrees, from about 0.4 to about 30 degrees, from about 0.5 to about 25 degrees, from about 0.6 to about 20 degrees, from about 0.7 to about 15 degrees, from about 0.8 to about 10 degrees, from about 0.9 to about 5 degrees, from about 1.0 to about 4 degrees, from about 1.5 to about 3 degrees, or any particular degree recited in the ranges recited above. In some embodiments, the taper (136) is in a range from about 5 to about 15 degrees, from about 6 to about 14 degrees, from about 7 to about 13 degrees, from about 7 to about 12 degrees, from about 7 to about 11 degrees, or from about 8 to about 10 degrees. In some embodiments, the taper (136) is about 9 degrees. It is to be understood, in one non-limiting example, that the taper (136) is configured for stacking or shipping two or more rails (100) of the current disclosure.

Further in reference to FIGS. 1A and 1B, the bottom portion (108) of the body (102) may also include, in one non-limiting example of the present disclosure, at least a bottom edge (138). In some embodiments, the bottom edge (138) may be aligned substantially horizontal to the middle portion (106). In some embodiments, the bottom edge (138) of the bottom portion (108) may include at least one end having a curved portion (140). In some embodiments, the bottom edge (138) of the bottom portion (108) may include two ends each having a curved portion (140) as illustrated in FIG. 1B.

Figure 5:
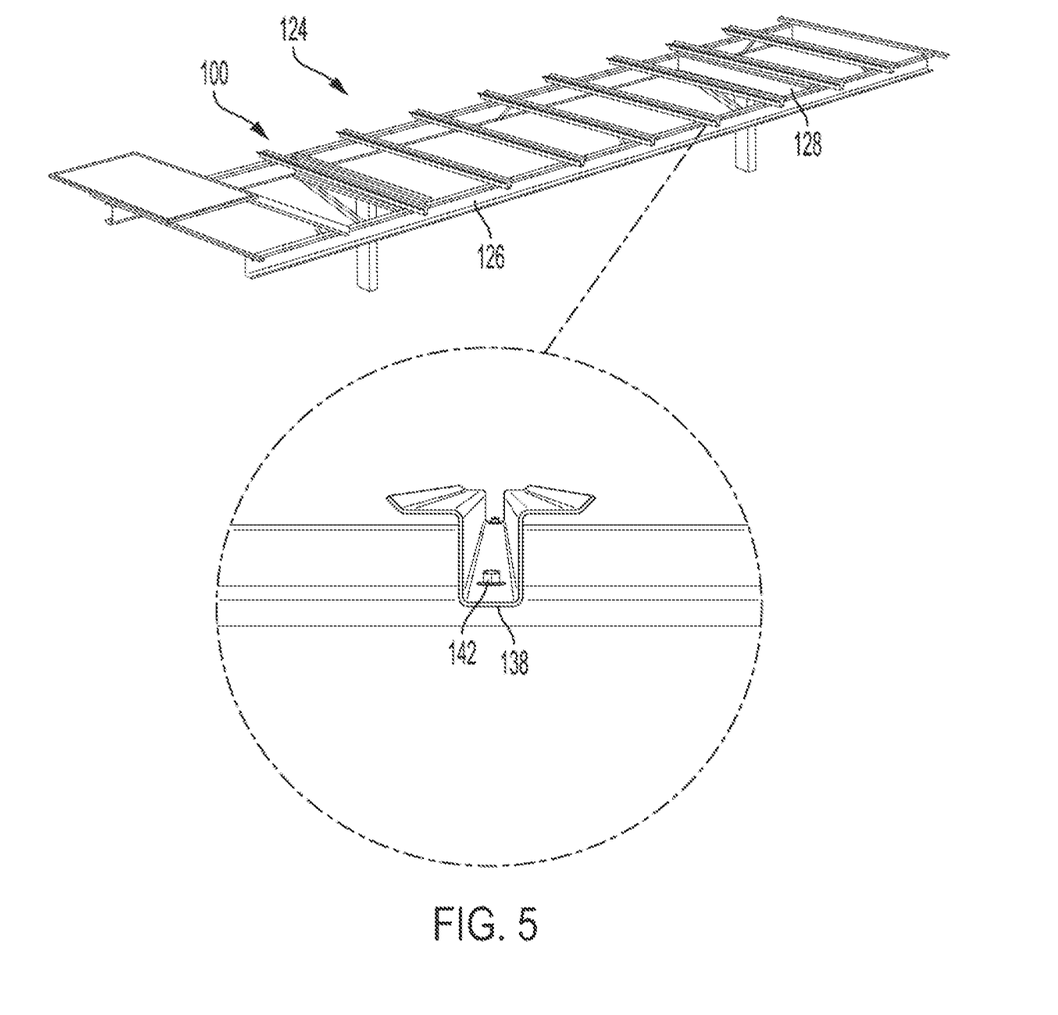
FIG. 5 is an exploded perspective view of the rail of FIG. 1C arranged in a series onto the photovoltaic module arrangement according to one example of the present disclosure.

In further embodiments, as illustrated in FIG. 5, the bottom portion (108) may include one or more holes (142) on the bottom edge (138). The one or more holes (142) of the bottom edge (138) can be used for aligning the rail (100) to a photovoltaic module arrangement (124). In some embodiments, the one or more holes (142) can be located at a proximal end, a distal end, or a center of the bottom edge (138). In some embodiments, the one or more holes (142) are used to connect the rail (100) to the beam (126) or the rafter (128) of the photovoltaic module arrangement (124). As will be understood by those of skill in the art, the connection of the rail (100) to the beam (126) or the rafter (128) can be accomplished by using bolts or nuts through the one or more holes (142) of the bottom edge (138).

The rail of the present disclosure can be made from any material as will be understood by those of skill in the art. In some embodiments, the top portion (104), the middle portion (106), or the bottom portion (108) of the rail (100) can be made from a material including, but not limited to steel, aluminum, or metal. In some embodiments, the top portion (104), the middle portion (106), or the bottom portion (108) of the rail (100) can be made from a material including, but not limited to, pre-galvanized steel, steel having a zinc coating, or hot-dip galvanized steel. As will be understood by those of skill in the art, hot-dip galvanization is a form of galvanization by the process of coating iron and steel with zinc, which alloys with the surface of the base metal when immersing the metal in a bath of molten zinc at a temperature of about 450° C. (about 842° F.).

The present disclosure further relates to a method of installing a rail for a photovoltaic arrangement. In some embodiments, the method of installing includes providing at least one rail (100) of any of the embodiments described herein. In some embodiments, the rail (100) may include the top portion (104), the middle portion (106), or the bottom portion (108). In some embodiments, the top portion (104) may include at least one upper edge (110) aligned substantially horizontal to the middle portion (106). In some embodiments, the side edges (132) of the middle portion (106) may be aligned substantially perpendicular to the upper edge (110). In some embodiments, the bottom edge (138) of bottom portion (108) may be aligned substantially horizontal to the middle portion (106). In some embodiments, the top portion (104) may include two or more ends (112) wherein each end (112) defines an angle (114), respectively, such that each end (112) receives the photovoltaic module (116) during installation. In some embodiments, the method of installing the rail (100) may further include connecting the at least one rail (100) to one or more beams (126) of the photovoltaic arrangement (124). In some embodiments, connecting the at least one rail (100) to the one or more beams (126) may include aligning the one or more holes (142) on the bottom edge (138) of the bottom portion (108) to one or more holes of the photovoltaic module arrangement (124) (e.g., one or more holes of the beam (126) or the rafter (128) of the photovoltaic module arrangement (124)).

While aspects of a rail for a photovoltaic module arrangement are shown in the accompanying figure and described hereinabove in detail, other aspects will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

It is worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other different components. It is to be understood that such depicted architectures are merely exemplary, and that, in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled", to each other to achieve the desired functionality, and any two components capable of being so associated can also be viewed as being "operably couplable", to each other to achieve the desired functionality. Specific examples of operably couplable include, but are not limited to, physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled", however, also may mean that two or more elements are not in direct contact with each other, but yet still co-operate or interact with each other.

In some instances, one or more components may be referred to herein as "configured to", "operative", "adapted", etc. Those skilled in the art will recognize that "configured to" can generally encompass active-state components, and/or inactive-state components, and/or standby-state components, unless context requires otherwise.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the scope of the subject matter described herein. It will be understood by those within the art that, in general, terms used herein, and especially in the appended claims (e.g., bodies of the appended claims), are generally intended as "open" terms (e.g., the term "including" should be interpreted as "including but not limited to", the term "having" should be interpreted as "having at least", the term "includes" should be interpreted as "includes but is not limited to", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations", without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

In summary, numerous benefits have been described which result from employing the concepts described herein. The foregoing disclosure has been presented for purposes of illustration and description. It is not intended to be exhaustive or limiting to the precise form disclosed. Modifications or variations are possible in light of the above teachings. It is intended that the claims submitted herewith define the overall scope of the present disclosure.

The invention claimed is:

1. A rail for a photovoltaic module arrangement, the rail comprising:
a body having at least a top portion, a middle portion, and a bottom portion;
the top portion comprising at least one upper edge, wherein at least one end of the at least one upper edge defines an angle configured to receive a photovoltaic module on the body, wherein the top portion further includes a notch formed as a cut-out in the top portion and extends inwardly from an outer edge of the top portion, wherein the notch is configured to align and secure the photovoltaic module arrangement in a longitudinal direction relative to the rail and the at least one upper edge of the top portion is configured to align and secure the photovoltaic module arrangement in a lateral direction relative to the rail;
the middle portion comprising at least one side edge; and
the bottom portion comprising at least a bottom edge.

2. The rail of claim 1, wherein the angle of the upper edge is in a range from about 0 degrees to about 90 degrees.

3. The rail of claim 2, wherein the angle of the upper edge is about 45 degrees.

4. The rail of claim 1, wherein the at least one end of the upper edge comprises a second end, the second end optionally comprising a curved portion.

5. The rail of claim 1, wherein the upper edge of the top portion comprises one or more holes for aligning the rail to the photovoltaic module arrangement.

6. The rail of claim 1, wherein the upper edge of the top portion is aligned substantially horizontal to the middle portion.

7. The rail of claim 1, wherein the side edge of the middle portion is aligned substantially perpendicular to the upper edge.

8. The rail of claim 1, wherein the side edge of the middle portion comprises a distal end having a curved portion.

9. The rail of claim 1, wherein the middle portion comprises at least two side edges.

10. The rail of claim 9, wherein the at least two side edges define a taper.

11. The rail of claim 10, wherein the taper is at an angle in a range from about 0.01 degrees to about 45 degrees.

12. The rail of claim 1, wherein the bottom edge of the bottom portion is aligned substantially horizontal to the middle portion.

13. The rail of claim 1, wherein the bottom edge of the bottom portion comprises at least one end having a curved portion.

14. The rail of claim 1, wherein the bottom portion comprises one or more holes for aligning the rail to the photovoltaic module arrangement.

15. The rail of claim 1, wherein the top portion, the middle portion, or the bottom portion comprise a material, the material selected from the group consisting of steel, aluminum, metal, pre-galvanized steel, steel having a zinc coating, hot dip galvanized steel, and a combination thereof.

16. A method of installing a rail for a photovoltaic module arrangement, the method comprising the steps of:
  providing at least one rail of claim 1; and
  connecting the at least one rail to one or more beams of the photovoltaic module arrangement,
  wherein connecting the at least one rail to the one or more beams comprises aligning one or more holes of a bottom portion of the at least one rail to one or more holes of the photovoltaic module arrangement.

17. A photovoltaic assembly, comprising:
  at least one rail for receiving and securing at least one photovoltaic module, the at least one rail comprising:
    a body having at least a top portion, a middle portion, and a bottom portion;
      the top portion comprising at least one upper edge, wherein at least one end of the at least one upper edge defines an angle configured to receive the at least one photovoltaic module on the body, wherein the top portion further includes a notch formed as a cut-out in the top portion and extends inwardly from an outer edge of the top portion;
      the middle portion comprising at least one side edge; and
      the bottom portion comprising at least a bottom edge; and
  the at least one photovoltaic module secured to the at least one rail,
  wherein the notch of the at least one rail is configured to align and secure the at least one photovoltaic module in a longitudinal direction relative to the at least one rail and the at least one upper edge of the top portion is configured to align and secure the at least one photovoltaic module in a lateral direction relative to the at least one rail.

* * * * *